United States Patent Office 3,369,175
Patented Feb. 13, 1968

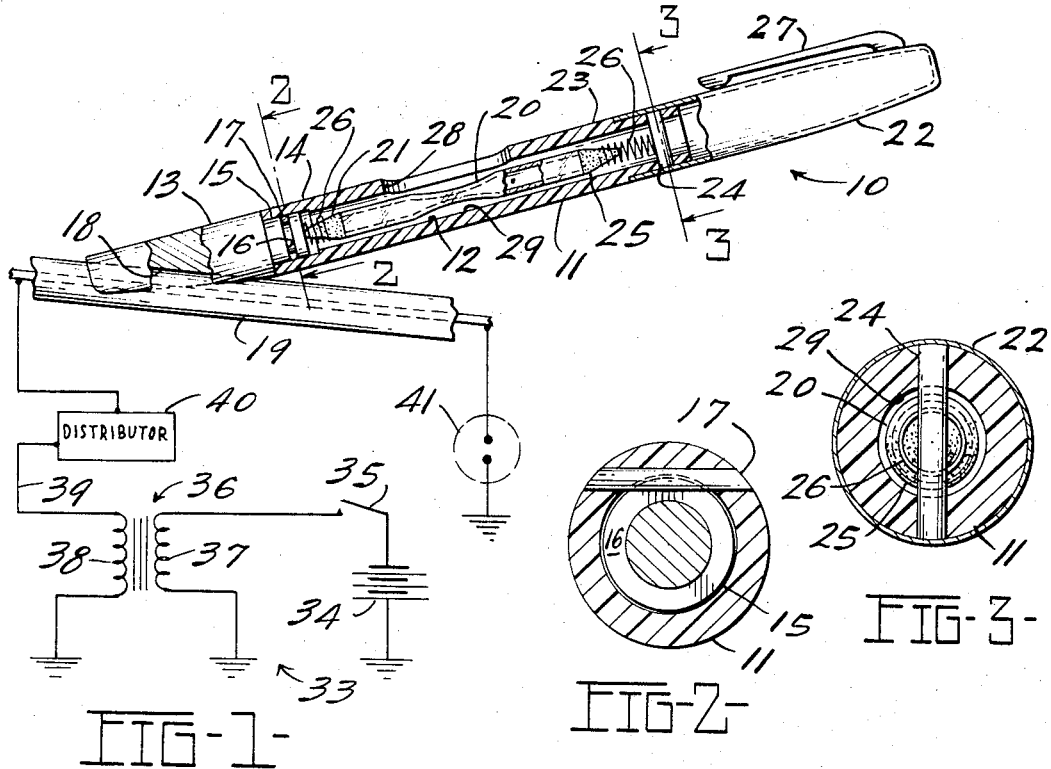
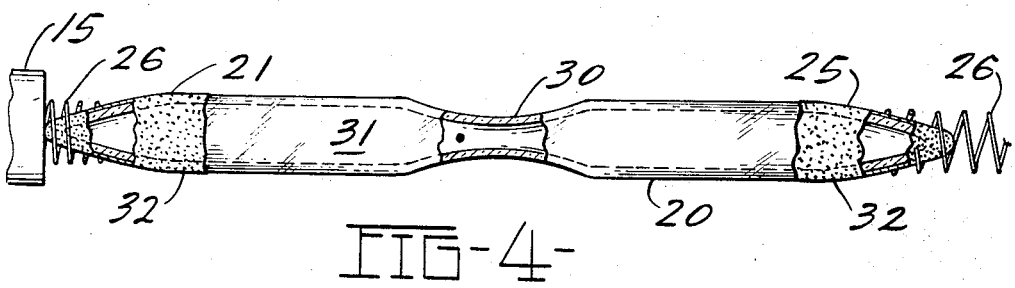
FIG-4-
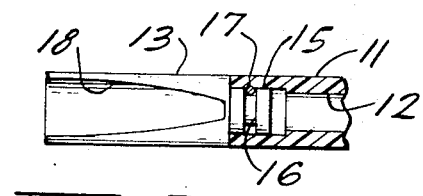
FIG-5-
INVENTOR:
ROBERT G. MORRIS.
BY
Owen & Owen
ATT'YS.

3,369,175
IGNITION SYSTEM FIRING INDICATOR INCLUDING A SWIVEL MOUNTED PICKUP HEAD
Robert G. Morris, Sylvania Township, Lucas County, Ohio, assignor to Champion Spark Plug Company, Toledo, Ohio, a corporation of Delaware
Continuation of application Ser. No. 416,416, Dec. 7, 1964. This application May 26, 1967, Ser. No. 641,708
1 Claim. (Cl. 324—17)

ABSTRACT OF THE DISCLOSURE

An ignition system tester having a tubular non-conductive body with a metallic rotatable pickup head mounted on one end. A high resistance glow lamp having means for limiting the amount of electrical current passing therethrough is positioned in the bore of the body. A metallic cap is secured to the other end of the body and a spring is positioned within the bore for urging the pickup head, the glow lamp, and the cap into electrical communication and for cushioning the glow lamp. An elongated opening is provided in the body adjacent the glow lamp. The glow lamp provides the sole electrically conductive path between the pickup head and the cap.

---

This application is a continuation of U.S. patent application Ser. No. 416,416, filed Dec. 7, 1964.

This invention relates to an apparatus for testing a vehicle ignition system and, more particularly, to an improved testing device for use on the high voltage side of an automotive ignition system.

Prior art high voltage ignition testing devices present a number of problems. Many of the prior art devices are dangerous to the operator. For example, a vehicle ignition system having an open circuit plug often has a potential in excess of thirty thousand volts. Unless a testing device has current limiting mechanism, if an operator grasps one end of a testing device and connects the other end into the 30,000 volt circuit at the very least he will receive a severe shock.

Another problem is that many of the prior art testing devices are complicated to operate. They often require the operator to calibrate the testing device for certain ignition systems or for certain conditions within a given ignition system.

Practically all of the automotive ignition systems, presently on the market, include rubber or plastic boots which are placed over the upper or top terminal of the spark plugs to prevent water from short-circuiting the ignition circuit. The prior art testing devices require a direct connection between the top terminal of a spark plug and an electrode of the testing device. Therefore, the boots which cover the top terminals of the spark plugs must either be removed or pierced during the testing operation.

It is the primary object of the instant invention to provide an improved ignition firing indicator which is inherently safe for an operator to use.

It is another object of the instant to provide an ignition firing indicator which can be used without removing or piercing the boots which surround automotive spark plugs.

It is still another object of the invention to provide an ignition firing indicator which can be used on different automotive ignition systems and for varying testing purposes without the necessity of adjustments to the indicator by the operator.

It is a still further object of the instant invention to provide an ignition firing indicator, with a novel pickup head, which can be used in testing ignition cables.

Further objects of this invention will become apparent from the following specification and drawing, in which:

FIG. 1 is a fragmentary, partially diagrammatic perspective view, with parts broken away, showing a typical automotive ignition system and showing an ignition firing indicator, according to the instant invention;

FIG. 2 is a vertical cross-sectional view taken along the line 2—2 of FIG. 1, and shown on an enlarged scale;

FIG. 3 is a view similar to FIG. 2, taken along the line 3—3 of FIG. 1;

FIG. 4 is a fragmentary, elevational view, showing a gas filled glow lamp, according to the instant invention with parts broken away; and FIG. 5 is a fragmentary, partially sectional view, showing a novel pickup head, according to the instant invention and shown rotated 90° from the position shown in FIG. 1.

Briefly, the invention relates to an apparatus for testing an ignition system of an automotive vehicle. The indicator comprises a longitudinally extending hollow body with a metallic pickup head rotatably mounted on a first end of the body. The pickup head defines a longitudinally extending groove suitable for receiving an ignition cable. A gas filled glow lamp is positioned within the hollow body and has a first end in electrical communication with the pickup head. A metallic cap is secured to a second end of the hollow body and is in electrical communication with a second end of the glow lamp.

A preferred embodiment of an ignition system firing indicator, according to the instant invention, is generally indicated by the reference numeral 10. The firing indicator 10 comprises a longitudinally extending body 11 having a coaxial and longitudinally extending bore 12 therethrough. The body 11 is constructed from the electrically nonconductive material.

A metallic pickup head 13 is rotatably mounted on a first end 14 of the body 11. The pickup head 13 has a coaxial stub 15 at its upper end, which is circular in transverse cross section, and having an inwardly extending circumferential groove 16 in its periphery. The stub 15 is inserted into the bore 12 of the body 11 and a pin 17 is secured to opposed sides of the body 11 and is seated in the groove 16. In this position, the pickup head 13 can be rotated through an angle of 360° and the pin 17 prevents longitudinal movement between the pickup head 13 and the body 11. However, other types of rotary mounting means may be used and still be within the scope of the instant invention.

The pickup head 13 defines a frusto-conical groove or recess 18 in one side of its periphery. The recess 18 converges inwardly as it approaches the upper end of the pickup head 13 and a standard ignition cable 19 fits snugly into the recess 18 during a testing operation (see FIG. 1). A longitudinally extending, capacitor type, gas filled glow lamp 20 is positioned within the bore 12 of the body 11 with a first end 21 of the lamp 20 in electrical communication with the stub 15 of the pickup head 13. A metallic cap 22, which is in electrical communication with a second end 25 of the lamp 20, is mounted on a second end 23 of the body 11 and is secured thereto by a pin 24. The cap 22 may be mounted on the body 11 by other means, for example, a press fit or by an adhesive.

Springs 26 are positioned adjacent the opposed ends 21 and 25 of the lamp 20 to protect the lamp 20 from shock forces and to urge or bias the pickup head 13, the lamp 20, and the cap 22 into electrical communication.

A clip 27 has one end secured to the cap 22. An elongate opening 28 is provided in one side of the hollow body 11 adjacent the lamp 20. An interior surface 29 of the hollow body 11, directly opposed to the opening 28, is black or some other low reflective color and acts as a "shadow box" during the operation of the tester.

When the glow lamp 20 is energized, the intensity of the light is increased by this "shadow box" effect.

Referring to FIG. 4, the glow lamp 20 comprises a sealed glass envelope 30 which defines a gas filled interchamber 31. The interchamber 31 is filled with neon gas or the like. A metallic coating 32 is applied to the exterior of the envelope 30 at the opposed ends 21 and 26. The lamp 20 is a low current device and as such serves as a current limiting device thereby protecting the operator during the testing of an ignition system. The lamp 20 is a capacitor type lamp and is energized when the charge on the opposed ends is of a sufficient potential differential to cause current flow between the opposed plates. The intensity of the "glow" or light produced depends upon the magnitude of the current and is increased as the potential difference is increased.

Referring to FIG. 1, a typical automotive ignition system is generally indicated by the reference numeral 33 and includes a battery 34, an ignition switch 35, and an ignition coil 36 having a primary winding 37 and a secondary winding 38. Breaker points and a condenser (not shown) are provided in the system 33 in a conventional manner and the secondary winding 38 is grounded on one side and the other side is connected to a wire 39 which leads to a distributor 40. The ignition cable 19, which is one of a plurality of ignition cables, leads from the distributor 40 to a spark plug 41.

If the spark plug 41 is fouled, the potential in the secondary or high voltage side of the ignition system 33 can be as low as 500 volts. On the other hand if the spark plug 41 is an "open circuit" plug, the potential can be as high as 30,000 volts. The normal operating range of a conventional automotive ignition system is between 4,000 volts and 20,000 volts.

During a testing operation, using the firing indicator 10 constructed according to the instant invention, the operator grasps the metallic cap 22 and places the pickup head 13 at any location along the cable 19 (see FIG. 1) or at a point adjacent the upper terminal of the spark plug 41. It is very important to note that the operator does not have to remove or pierce the protective resilient boot which is normally placed over automotive spark plugs. The pickup head 13 serves as one plate of a capacitor and electrical energy is transferred to the pickup head 13. An operative electrical circuit is then established between the pickup head 13 and the metallic cap 22, with the operator acting as the ground. If the spark plug 41 is operating properly and the secondary side of the ignition system 33 is in the normal operating range, the lamp 20 is energized to a normal operating intensity. On the other hand, if the spark plug 41 is fouled, and the secondary voltage is below normal, the glow lamp 20 will either not be energized or will dim to a low intensity glow. When this occurs the operator knows that the spark plug 41 should be inspected. Similarly, if the lamp 20 is energized to an extremely high intensity, the operator realizes that a high plug firing voltage is present. This condition may be caused by, for examples, an open circuit plug, a wide spark gap, or an unusual cylinder condition. Therefore, the operator can be observing the intensity of the lamp 20 isolate a defect in the ignition high voltage electrical system.

If the operator prefers, he may ground the metallic cap 22 against, for example, the engine block rather than holding the cap 22 in his hand. Also, if the operator is testing an ignition system which does not include protective boots over the spark plug terminals, the operator may place the pickup head 13 directly against the upper terminal of a spark plug and the current limiting feature of the lamp 20 protects the operator from an electrical shock.

The operator may also test the continuity of an ignition cable by placing the cable 19 into the recess 18 and moving the firing indicator 10 along the cable 19. Because the majority of the ignition cables presently being used in the automotive industry are resistor type cables and do not have a wire extending therethrough, this is a very important feature of the instant invention. If there is a defect in the ignition cable this fact will be readily observed by the intensity of the glow lamp 20.

The firing indicator 10 may also be moved along the cable 19 without the cable 19 in the recess 18. When this is done a high intensity of the lamp 20 indicates cracks, leaks or worn spots in the insulation. The indicator 10 may also be used to probe for cracks or carbon tracks at the coil or distributor towers.

An important use of the indicator is in observing the regularity of flashing on each plug circuit. This often very quickly pinpoints the locality of trouble on an engine which has occasional missing.

While the present invention has been disclosed with a specific arrangement and disposition of the parts, it should be expressly understood that numerous modifications and changes may be made without departing from the scope of the appended claim.

I claim:

1. An ignition system tester comprising, in combination, a longitudinally extending, electrically nonconductive body having a coaxial, longitudinal bore extending therethrough, a metallic pickup head having its inner end rotatably secured to a first end of said body with cooperating means on said head and body whereby said head will freely rotate relative to the axis of said body but is prevented from moving in axial and radial directions, the outer end of said head having a recess suitable for receiving a portion of an ignition cable, a high resistance glow lamp positioned within such bore having a first end in direct electrical communication with said pickup head, said glow lamp having means for limiting the amount of electrical current passing therethrough to thereby protect an operator using the tester, an elongate opening in the wall of said body adjacent said glow lamp whereby said glow lamp may be observed therethrough, a metallic cap secured to a second end of said body and in electrical communication with the second end of said glow lamp, said metallic cap having a portion extending beyond said electrically nonconductive body to be grasped by an operator whose body serves as a ground during a testing operation, said glow lamp providing the sole electrically conductive path between said pickup head and said metallic cap whereby said lamp will be energized to a predetermined intensity level during the testing of a normally operating ignition system and to an increased or decreased level of intensity visually discernible from such predetermined level of intensity when testing an abnormally operating ignition system and spring means positioned within such bore for urging said pickup head, said glow lamp, and said cap into electrical communication and for cushioning said glow lamp.

References Cited

UNITED STATES PATENTS

| | | | |
|---|---|---|---|
| 1,957,802 | 5/1934 | Rabezzana | 324—17 |
| 2,323,931 | 7/1943 | Peters | 324—18 |
| 2,482,016 | 9/1949 | McCoy | 324—149 |

RUDOLPH V. DOLINEC, *Primary Examiner.*

M. J. LYNCH, *Assistant Examiner.*